(12) United States Patent
Mishra et al.

(10) Patent No.: US 9,550,334 B2
(45) Date of Patent: Jan. 24, 2017

(54) METHOD OF REPAIRING A CORE STIFFENED STRUCTURE

(71) Applicant: Bell Helicopter Textron Inc., Forth Worth, TX (US)

(72) Inventors: Suvankar Mishra, Carrollton, TX (US); Jesse Wrabel, Fort Worth, TX (US); John R. McCullough, Weatherford, TX (US); Randall Willnow, Mansfield, TX (US); Carl May, Mansfield, TX (US)

(73) Assignee: Bell Helicopter Textron Inc.

( * ) Notice: Subject to any disclaimer, the term of this patent is extended or adjusted under 35 U.S.C. 154(b) by 186 days.

(21) Appl. No.: 14/496,271

(22) Filed: Sep. 25, 2014

(65) Prior Publication Data

US 2016/0089844 A1    Mar. 31, 2016

(51) Int. Cl.

| | | |
|---|---|---|
| *B29C 44/12* | (2006.01) | |
| *B29C 73/02* | (2006.01) | |
| *B29C 73/04* | (2006.01) | |
| *B29C 73/06* | (2006.01) | |
| *B29C 73/10* | (2006.01) | |
| *B29C 65/00* | (2006.01) | |
| *B29C 44/18* | (2006.01) | |
| *B64F 5/00* | (2006.01) | |

(Continued)

(52) U.S. Cl.
CPC ............ *B29C 73/10* (2013.01); *B29C 44/128* (2013.01); *B29C 44/1214* (2013.01); *B29C 44/1276* (2013.01); *B29C 44/18* (2013.01); *B29C 66/02241* (2013.01); *B29C 73/02* (2013.01); *B29C 73/04* (2013.01); *B64F 5/0081* (2013.01); *B29C 73/06* (2013.01); *B29C 2073/264* (2013.01); *B29L 2031/082* (2013.01); *B29L 2031/3076* (2013.01); *B29L 2031/3085* (2013.01); *B29L 2031/3088* (2013.01); *B29L 2031/608* (2013.01)

(58) Field of Classification Search
CPC ............ B29C 44/1214; B29C 44/1228; B29C 44/1233; B29C 44/1266; B29C 44/1276; B29C 44/128; B29C 44/18; B29C 44/186; B29C 66/02241; B29C 70/78; B29C 73/04; B29C 73/06; B29C 73/10; B29C 73/264; B29C 73/02; B29L 2031/082; B29L 2031/3076; B29L 2031/3085; B29L 2031/3088; B29L 2031/608; B64F 5/0081
See application file for complete search history.

(56) References Cited

U.S. PATENT DOCUMENTS 3,533,894 A  *  10/1970  Engelbrecht ............ B31D 3/02
                                                    264/152
3,970,324 A  *   7/1976  Howat ..................... A63C 5/12
                                                    156/197

(Continued)

FOREIGN PATENT DOCUMENTS

WO    WO 2013/108328 A1  *  7/2013

*Primary Examiner* — Michael Tolin
(74) *Attorney, Agent, or Firm* — Noah A. Tevis

(57) ABSTRACT

A method of repairing a core stiffened structure can include removing a damaged portion of the core stiffened structure; creating a cutout in a portion of a repair core member; fitting the repair core member onto an existing core member such that the cutout mates with a portion of the existing core member; bonding the repair core member to the existing core member; and placing a skin patch over the repair core member.

13 Claims, 9 Drawing Sheets

(51) Int. Cl.
B29L 31/30  (2006.01)
B29L 31/08  (2006.01)
B29L 31/60  (2006.01)
B29C 73/26  (2006.01)

(56) References Cited

U.S. PATENT DOCUMENTS

| | | | | |
|---|---|---|---|---|
| 6,767,606 | B2* | 7/2004 | Jackson | B32B 3/28 |
| | | | | 156/250 |
| 9,186,756 | B2* | 11/2015 | Shigetomi | F02C 7/045 |
| 2006/0000186 | A1* | 1/2006 | Carlson | B29C 44/1228 |
| | | | | 52/793.1 |
| 2007/0275212 | A1* | 11/2007 | Stadtlander | B29C 73/10 |
| | | | | 428/116 |
| 2009/0269547 | A1* | 10/2009 | Meyer | B29C 44/1228 |
| | | | | 428/116 |
| 2014/0115853 | A1* | 5/2014 | Thiagarajan | B29C 73/063 |
| | | | | 29/402.11 |
| 2014/0116600 | A1* | 5/2014 | Mishra | B29C 44/186 |
| | | | | 156/78 |

* cited by examiner

METHOD OF REPAIRING A CORE STIFFENED STRUCTURE

BACKGROUND

Technical Field

The embodiments of the present disclosure relate to the repair of a core stiffened structure.

Description of Related Art

In a conventional repair process, a damaged core stiffened structure is repaired by removal of the damaged honeycomb core and adding a new honeycomb core having a different cell size and material from that of the damaged honeycomb core. Such a process can be expensive, time-consuming, and can require multiple curing and bonding processes. There is a need for an improved method of repairing a honeycomb core stiffened structure.

DESCRIPTION OF THE DRAWINGS

The novel features believed characteristic of the methods and apparatuses of the present disclosure are set forth in the appended claims. However, each method and apparatus, as well as a preferred mode of use, and further objectives and advantages thereof, will best be understood by reference to the following detailed description when read in conjunction with the accompanying drawings, wherein:

DETAILED DESCRIPTION

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
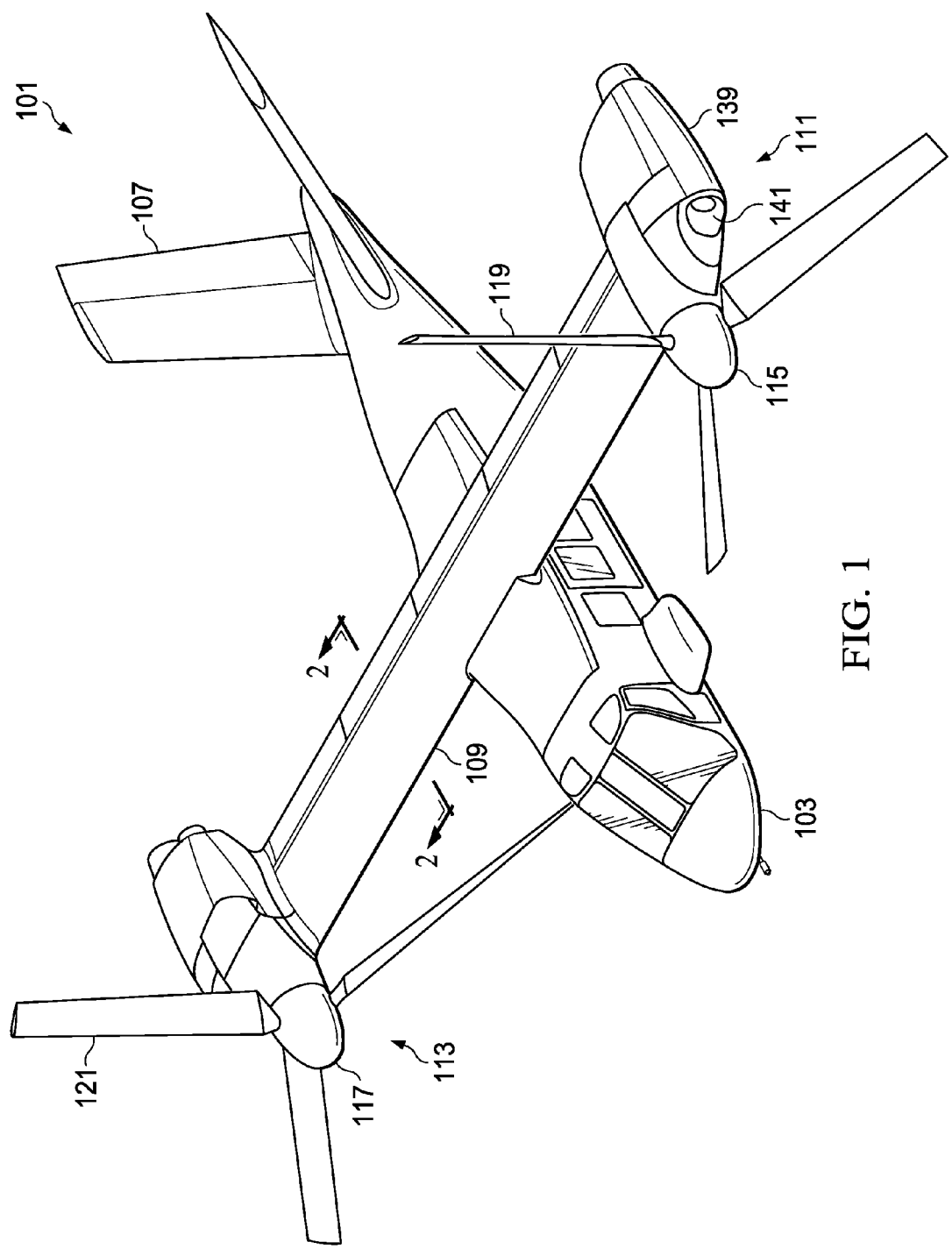
FIG. 1 is a perspective view of a rotorcraft according to one example embodiment.

Referring to FIG. 1 in the drawings, a tiltrotor aircraft 101 is illustrated. Tiltrotor aircraft 101 can include a fuselage 103, a landing gear, a tail member 107, a wing 109, a propulsion system 111, and a propulsion system 113. Each propulsion system 111 and 113 can include an engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in an airplane mode, in which proprotors 115 and 117 are positioned substantially horizontal to provide a forward thrust in which a lifting force is supplied by wing 109. Tiltrotor aircraft 101 can also fly in helicopter mode, in which proprotors 115 and 117 are positioned substantially vertical to provide a lifting thrust. It should be appreciated that tiltrotor aircraft can be operated such that proprotors 115 and 117 are selectively positioned between airplane mode and helicopter mode, which can be referred to as a conversion mode. A variety of members of aircraft 101 can be manufactured as a core stiffened structure, as discussed further herein.

Figure 2:
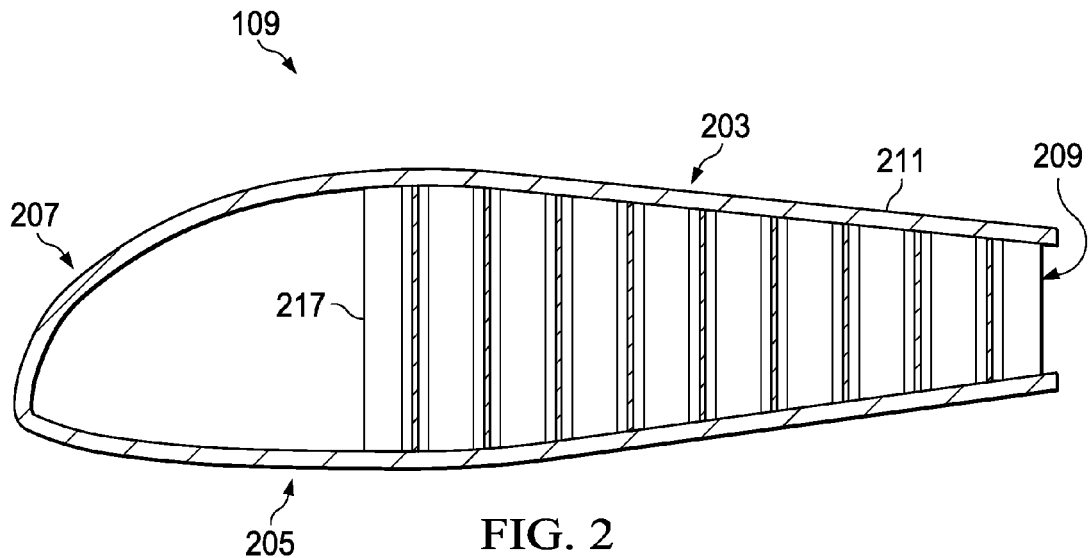
FIG. 2 is a cross-sectional view of a wing taken from section lines 2-2 in FIG. 1, according to an illustrative embodiment.

Referring now also to FIG. 2, wing 109 is an example of an aircraft structure than can be configured with core to efficiently provide strength and stiffness. Wing 109 can include a leading edge portion 207, an aft portion 209, an upper skin portion 203, and a lower skin portion 205. In the illustrated embodiment, the skin 211 forms an aerodynamic surface with a core member 217 forming an internal stiffening structure.

It should be appreciated that rotorcraft 101 is merely illustrative of an aircraft for with which one or more methods of the present disclosure can be utilized with regard to. Further, wing 109 is merely illustrative of the wide variety of core stiffened structures that can utilize one or more methods disclosed herein. In another embodiment, a flaperon or other control surface airfoil member is the core stiffened structure, for example.

Figure 3:
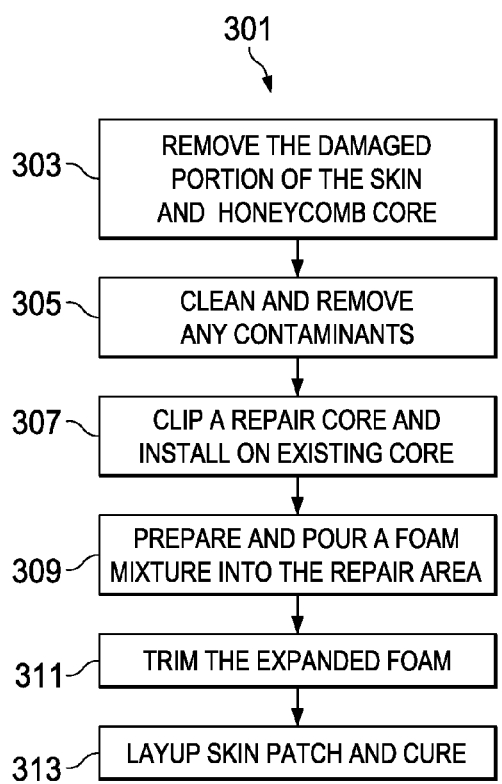
FIG. 3 is a schematic view of a method of repairing a honeycomb core stiffened structure, according to an example embodiment.

Referring now to FIG. 3, a method 301 of repairing a honeycomb core stiffened structure is schematically illustrated. During operation of aircraft 101, damage to a core stiffened structure can occur in a variety of scenarios, such as a collision with an object during flight, battle damage, or even from ground personnel while the aircraft is one the ground. In order to ensure safety of the aircraft, the damaged portion of the core stiffened structure must be repaired. It should be appreciated that the damage can exist in the skin and/or the honeycomb core. However, removal of the damaged skin may also require repair of the honeycomb core since the skin and the honeycomb core are bonded together. For illustrative purposes, method 301 is illustrated and described herein with regard to repair of wing 109; however, it should be appreciated that method 301 can be performed on any core stiffened structure.

Figure 4:
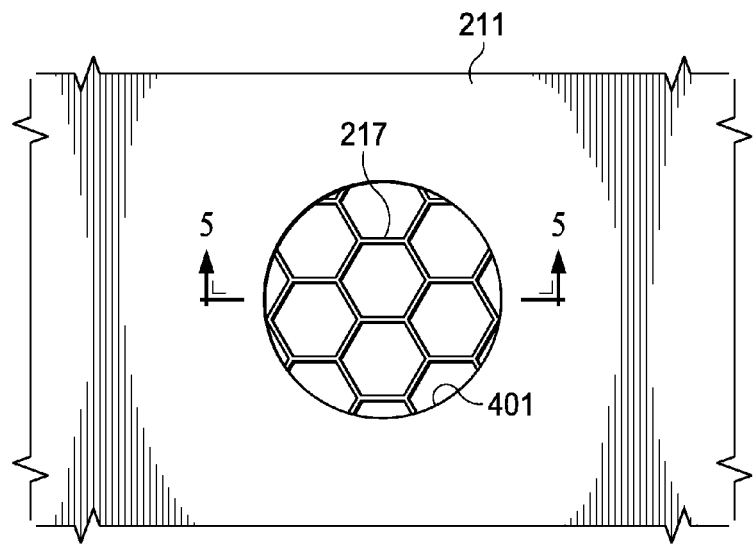
FIG. 4 is a top view of a portion of a wing during the repair process, according to an example embodiment.
Figure 5:
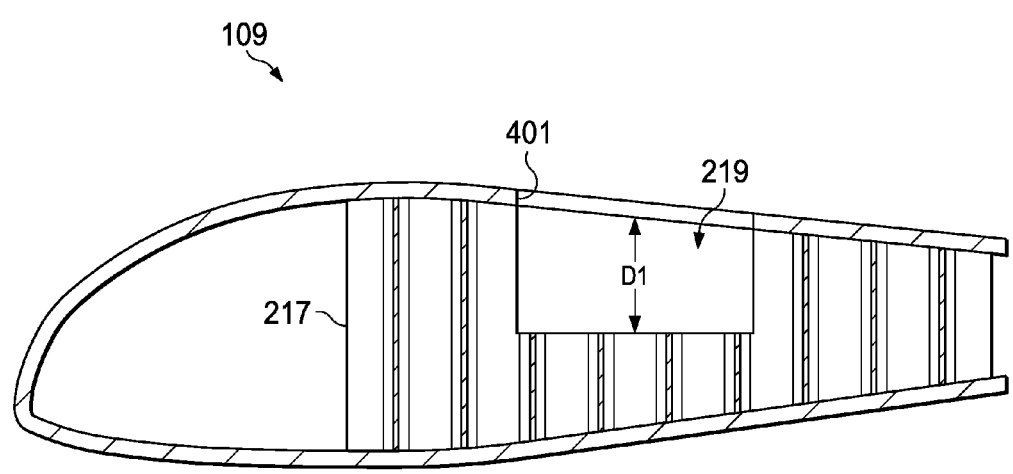
FIG. 5 is a cross-sectional view of the wing taken from section lines 5-5 in FIG. 4, according to an example embodiment.

Method 301 can include a step 303 of removing the damaged portion of skin, such as upper skin 211, and the damaged portion of honeycomb core, such as core member 217. Referring also to FIGS. 4 and 5, step 303 is illustrated in further detail. FIG. 4 shows the damaged portion of skin 211 removed by a cutout 401, which in the illustrated embodiment is circular; however, it should be appreciated that the cutout can be any implementation specific shape. Further, FIG. 5 illustrates that the damaged core portion is removed to form a cavity 219 to a depth D1 until a relatively planar surface is obtained with non-damaged core 217 remaining therebelow. Removal of the damaged skin portion and the damaged core portion can be performed with a circular saw, for example.

Method 301 can further include a step 305 for cleaning and removing any contaminants in and around cavity 219. Step 305 can include using a cleaning solution, such as an alcohol based fluid, to remove contaminants.

Figure 6A:
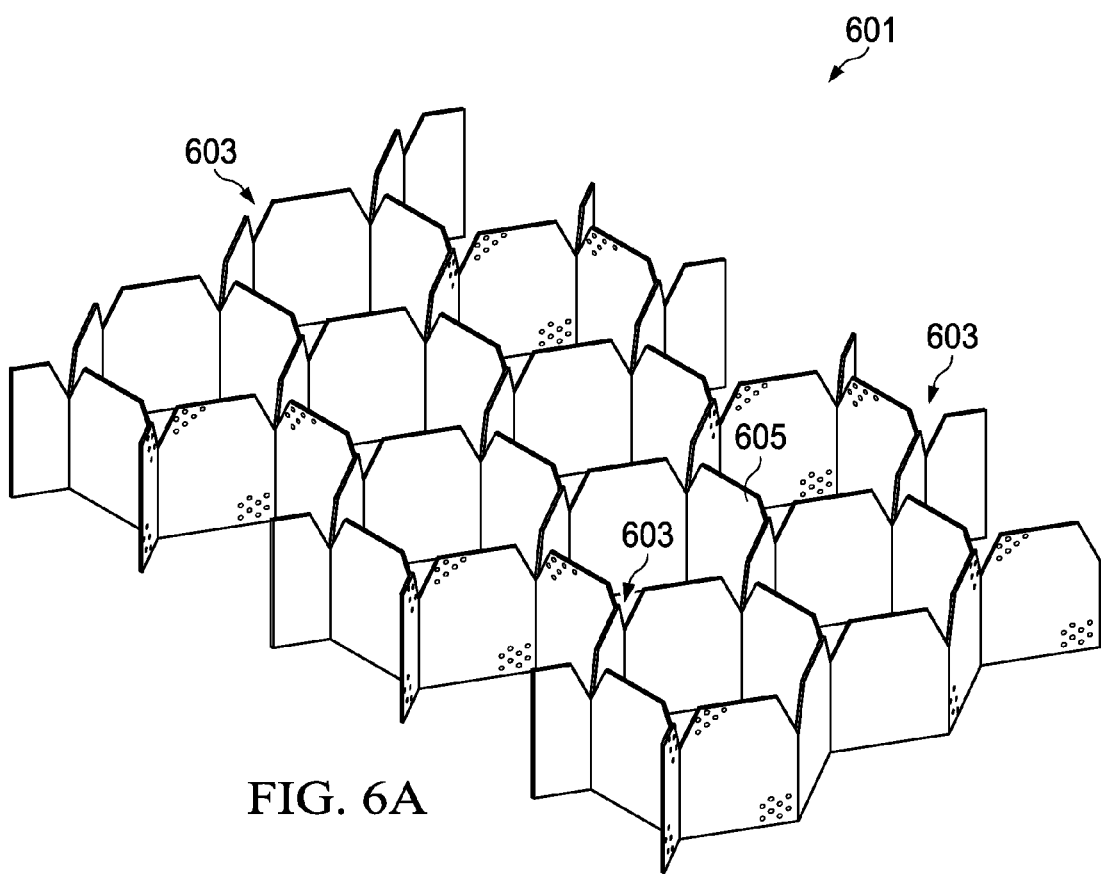
FIG. 6A is a perspective view of a repair core, according to one example embodiment.
Figure 6B:
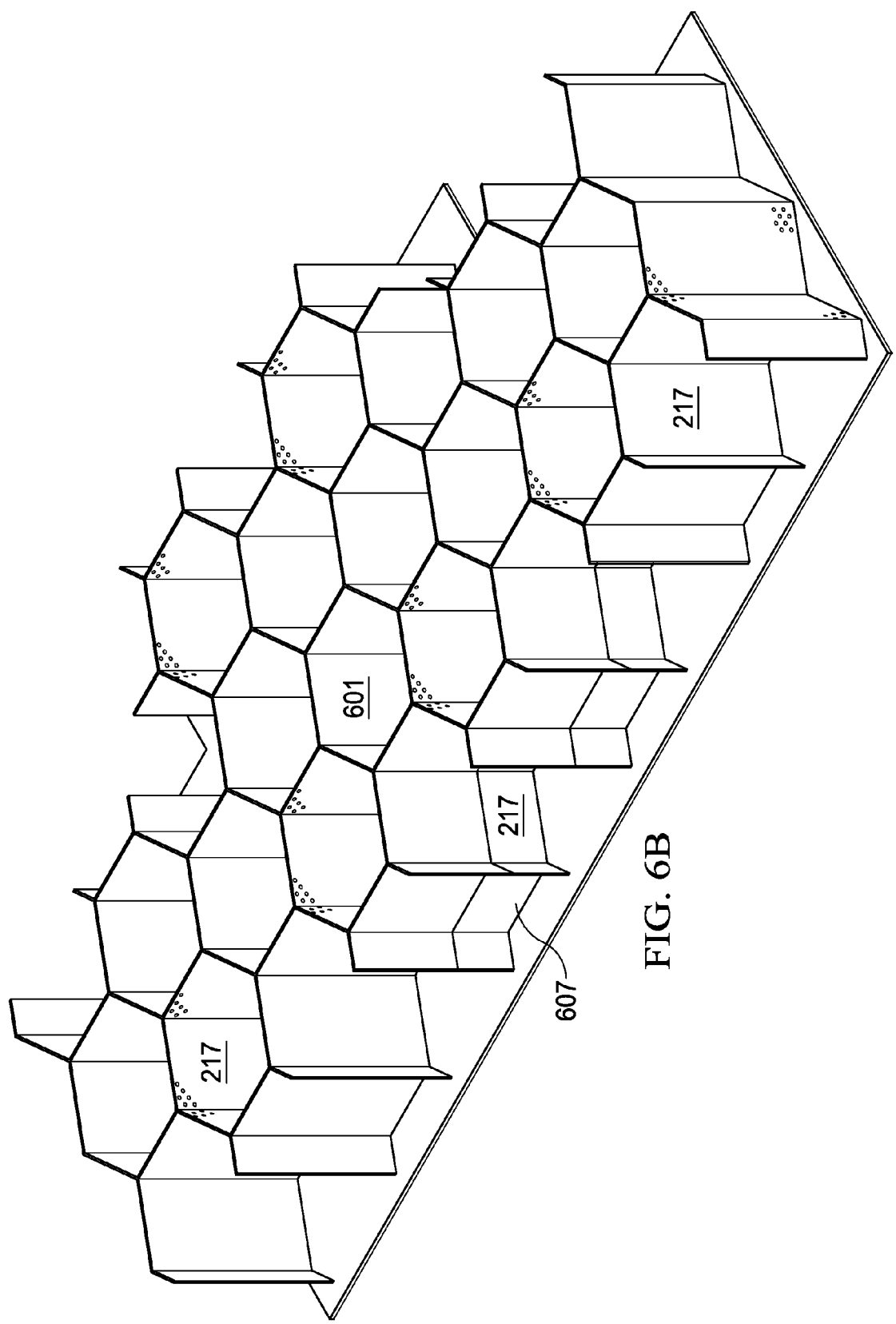
FIG. 6B is a perspective view of a repair core assembled to a non-damaged core, according to one example embodiment.

Method 301 can include a step 307 of clipping a repair core member and installing onto the existing non-damaged core. Referring now also to FIGS. 6A and 6B, one example embodiment of step 307 is illustrated. A repair core 601 is sized in accordance with the cavity 219; however, a depth of repair core 601 is oversized. In the example embodiment, one side of the repair core 601 has each node clipped out or removed leaving a plurality of clipped voids 603. The node is otherwise the location where one or more cell walls join near an exposed surface network. For clarity, only a few of the clipped voids 603 are labeled as such in FIG. 6A. The depth of each clipped void 603 can be similar to the amount of the oversized depth of the repair core 601. The clipping of the nodes generates a plurality of flaps 605 that overlap adjoining cell walls 607 of non-damaged core 217.

One unique advantage of utilizing the repair core 601 is that the clipped voids 603 align with the nodes of the non-damaged core 217, thereby causing the cell walls of the repair core 601 to align with the cell walls of the non-damaged core 217 so as to recreate the original structural stiffness after the repair core 601 and the non-damaged core 217 are bonded together. Further, the overlap of the flaps 605 of repair core 601 with cell walls 607 of non-damaged core 217 function as locking mechanisms to prevent the repair core 601 from pushing upward in the subsequent bonding step.

Figure 7A:
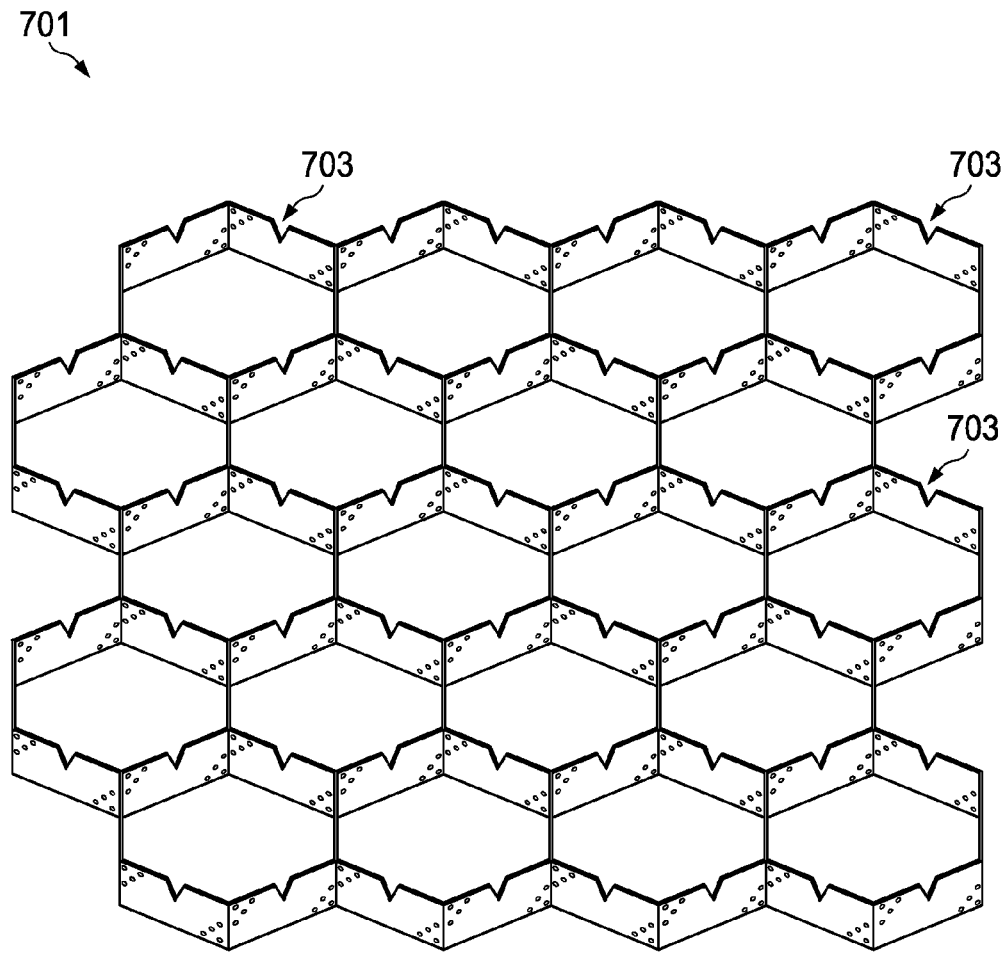
FIG. 7A is a perspective view of a repair core, according to one example embodiment.
Figure 7B:
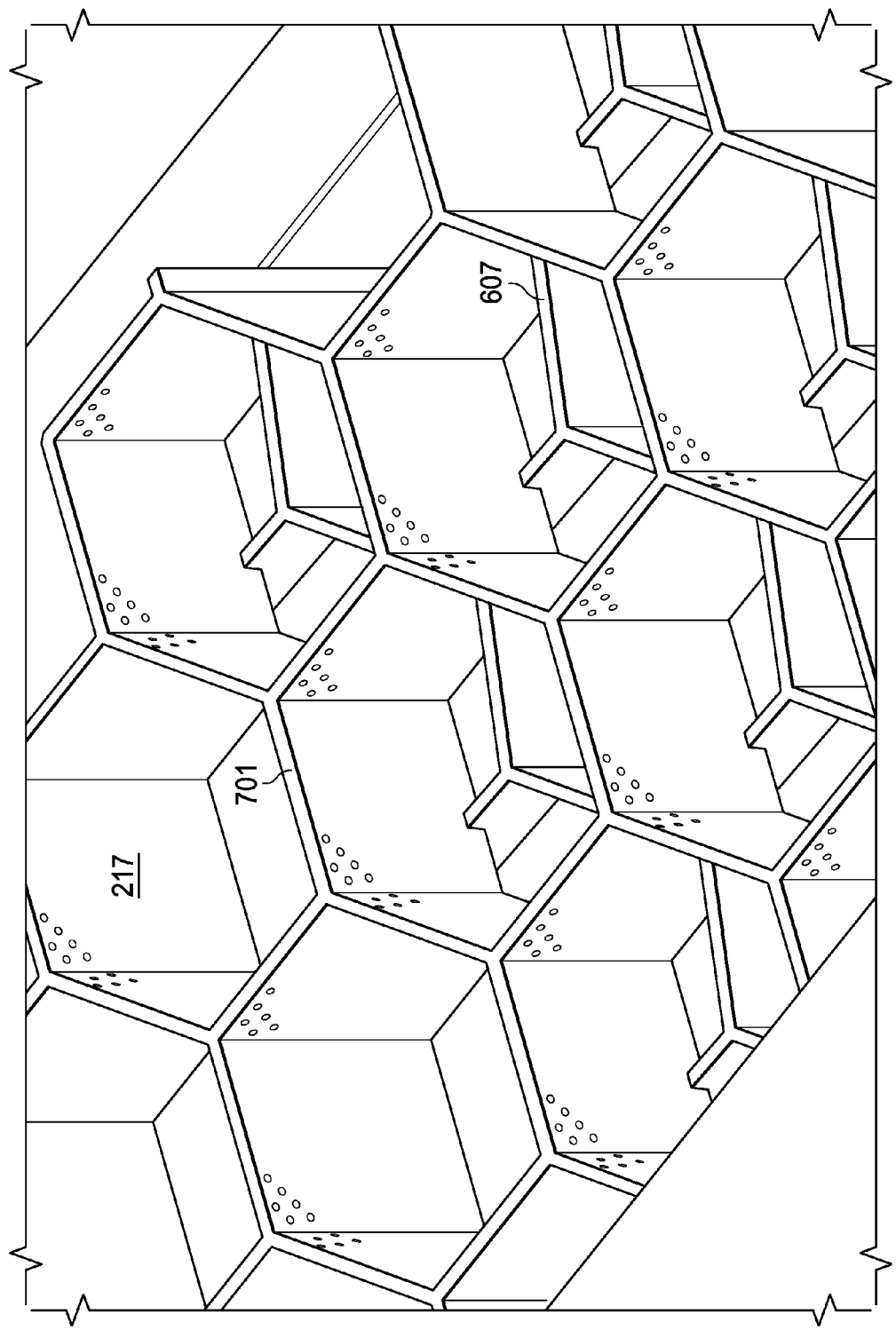
FIG. 7B is a perspective view of a repair core assembled to a non-damaged core, according to one example embodiment.

Referring now to FIGS. 7A and 7B, another embodiment of step 307 is illustrated. A repair core 701 is sized in accordance with the cavity 219; however, a depth of repair core 701 is oversized. In the example embodiment, one side of the repair core 701 has a plurality of clipped voids 703 located in each cell wall on one side of the surface network. For clarity, only a few of the clipped voids 703 are labeled as such in FIG. 7A. The depth of each clipped void 703 can be similar to the amount of the oversized depth of the repair core 701. In the example embodiment, each clipped void 703 is approximately "V" shaped.

One unique advantage of utilizing the repair core 701 is that the clipped voids 703 can be located and positioned to coincide with the nodes of the non-damaged core 217, thereby causing the cell walls of the repair core 601 to be offset with the cell walls of the non-damaged core 217 such that the nodes of the non-damaged core 217 align with the approximate center of each cell of repair core 701. The misalignment between cell walls of repair core 701 and the cell walls of non-damaged core 217 creates a tailored stiffness that is less than the original stiffness, which can be desirable in some implementation specific repair scenarios. Further, the clipped voids 703 of repair core 701 act like a wedge to cell walls 607 of non-damaged core 217 so as to function as locking mechanisms to prevent the repair core 701 from pushing upward in the subsequent bonding step.

Figure 8:
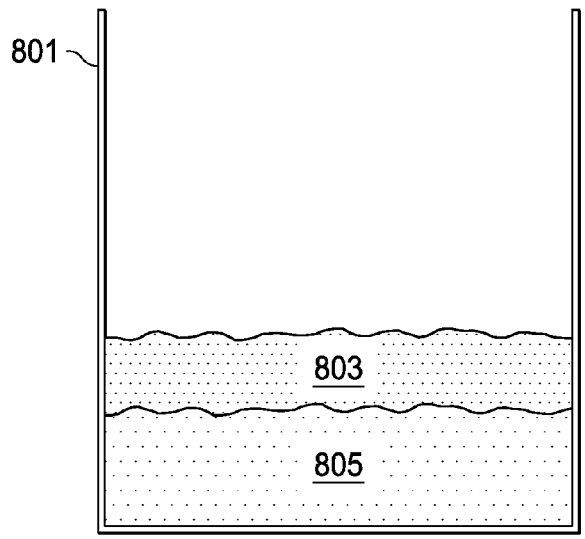
FIG. 8 is a stylized view of components of the foam system, according to an example embodiment.
Figure 9:
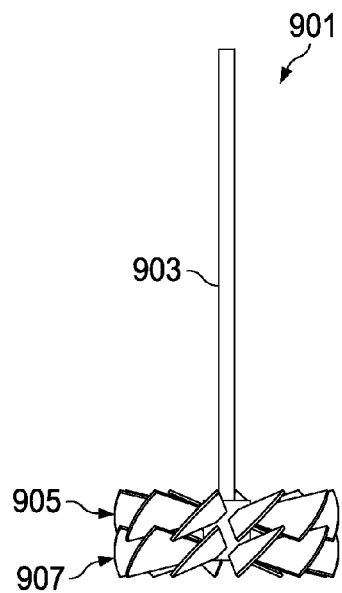
FIG. 9 is a front view of a mixer used to mix the foam system, according to an example embodiment.
Figure 10:
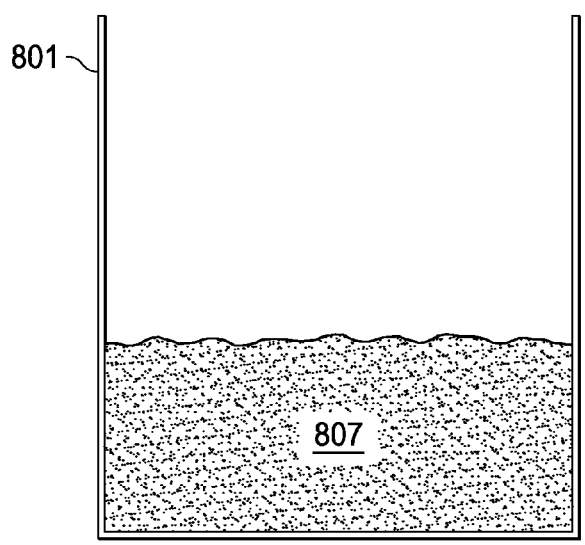
FIG. 10 is a stylized view of a mixture of the foam system, according to an example embodiment.

Method 301 can include a step 309 for mixing and preparing a foam mixture. Referring now also to FIGS. 8-10, the foam system used in method 301 is preferably a pourable urethane foam system that expands to fill and bond together the repair core, such as repair cores 601 or 701, and non-damaged core 217. Upon curing, the foam is preferably rigid and flexible, while having a relatively low density, or a density similar to the core. In the illustrated embodiment, the foam system is a polyisocyanurate pour foam system marketed under the name of Stepanfoam BX 450, by the Stepan Chemical Company. It should be fully appreciated that other foam systems may be used. The Stepanfoam BX 450 includes two separate resin components, namely a resin T (70% by weight) 805 and a resin R (30% by weight) 803. The desired weight amounts of resin T 805 and resin R 803 are measured and poured into a container 801. The resin T 805 and resin R 803 are mechanically agitated to form a homogenous mixture 807. A mixer 901 can be used in rotation in order to mix resin T 805 and resin R 803 to form mixture 807. Mixer 901 includes a shaft 903, the shaft 903 being configured to be driven by a drill motor, or the like. Mixer 901 may include a plurality of blades located on a first blade disc 905 and a second blade disc 907. In the illustrated embodiment, mixer 901 is rotated at 3500 revolutions per minute for 10-15 seconds when mixing resin T 805 and resin R 803 to form mixture 807.

Figure 11:
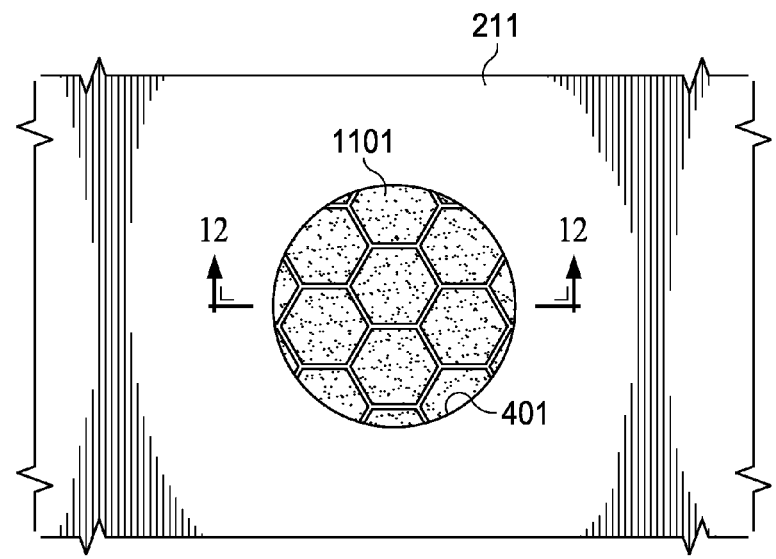
FIG. 11 is a top view of a portion of a wing during the repair process, according to an example embodiment.
Figure 12:
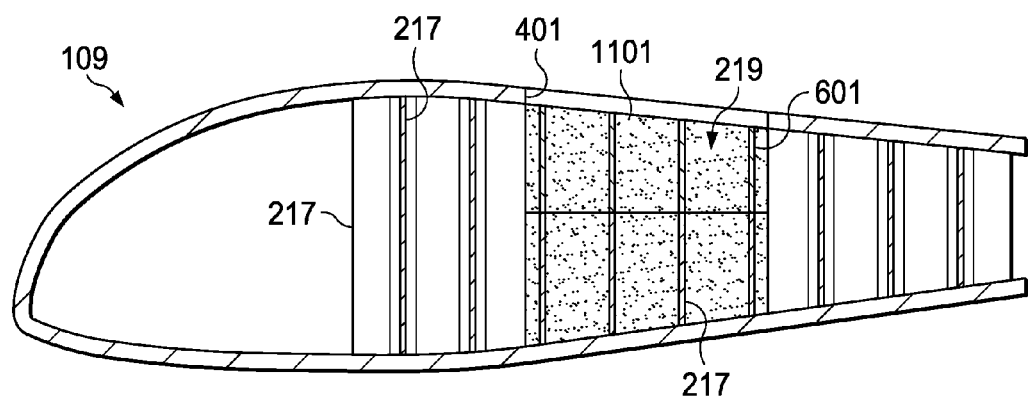
FIG. 12 is a cross-sectional view of the wing, taken from section lines 12-12 in FIG. 11, according to an example embodiment.

A step 309 includes pouring foam mixture 807 into the repair area. Once the mixing in step 409 is complete, it is preferred that mixture 807 is poured into the repair area as quickly as possible. Once foam mixture 807 is poured into cavity 219, foam mixture 807 is allowed to expand and fill the voids so as to form an expanded foam 1101, which for illustrative purposes is shown in FIGS. 11 and 12. In the illustrated embodiment, the foam mixture 807 is allowed to "free rise"; however, an alternative embodiment can include restricting the expansion by placing an upper mold over the repair area. Preferably, the upper mold would include an opening that allows the release of outgases. The expanded foam 1101 functions to bond the repair core (601 or 701) and the non-damaged core together. The locking features of the repair core function to prevent the repair core and the non-damage core from becoming separated during the bonding procedure. Foam is the preferred method of bonding the repair core and the non-damage core together; however, in an alternative embodiment a paste adhesive or other type of adhesive is utilized to bond the repair core and the non-damage core together. In such an embodiment, the paste adhesive would be located in between the adjoining portions of the repair core and the non-damage core.

A step 311 includes trimming the expanded foam 1101 after foam mixture 807 has fully expanded and become semi-rigid. Trimming the expanded foam 1101 includes reducing the outer surface to correspond approximately with the outer airfoil surface of skin 211. Step 311 can be performed by any variety of processes, such as a cutting, sanding, machining, to name a few examples. FIG. 12 is an illustration of expanded foam 1101 trimmed such that the outer surface corresponds approximately to the outer airfoil surface of skin 211.

Figure 13:
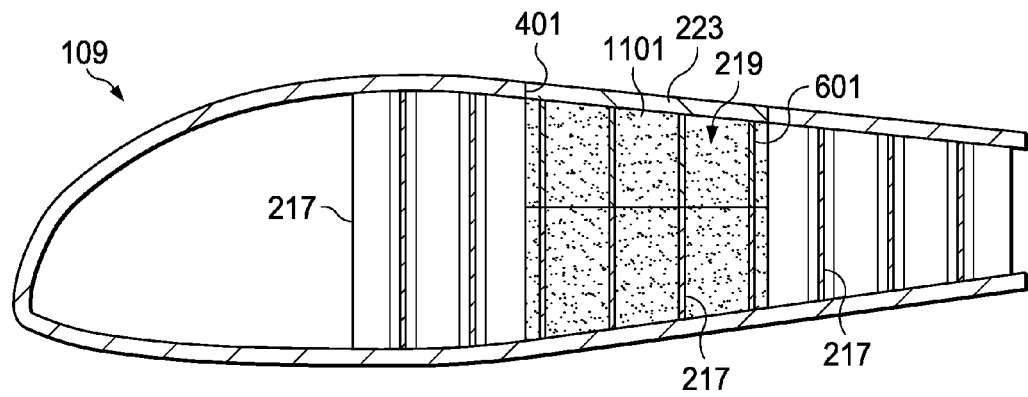
FIG. 13 is a cross-sectional view of the wing with a skin patch installed, according to an example embodiment.

A step 313 includes laying up a composite skin patch 223 on the expanded foam 1101 and curing the repair assembly. An illustrative composite skin patch 223 is shown in FIG. 13. In the illustrated embodiment, composite skin patch 223 is a plurality of plies of composite fibers with resin (i.e. pre-preg). Composite skin patch 223 can be laid directly onto the outer surface of expanded foam 1101. Composite skin patch 223 and expanded foam 1101 are allowed to cure. In the illustrated embodiment, the curing of composite skin patch 223 and expanded foam 1101 takes place at room temperature, such that an artificial heat source is not required. In another embodiment, skin patch 223 can be a precured composite skin patch or of another rigid material, such as a metal skin patch. In such an embodiment, the rigid skin patch can be adhesively bonded to the expanded foam 1101 with an adhesive.

Method 301, as described further herein, includes significant advantages of conventional repair methods. For example, method 301 does not require special repair tooling that would otherwise be required to separately lay-up and cure a composite patch. Further, method 301 does not require thermal equipment that would be required if an adhesive otherwise required an elevated temperature to cure. Further, method 301 can be performed in the field such that repairs to composite core stiffened structures do not have to be performed in a facility having specialized equipment. Further, when method 301 is performed on composite core stiffened structure wherein the composite core is large cell core (cells greater than 0.5 inches), the expanded foam 1101 (as trimmed) acts as a tooled surface so as to provide uniform support of the composite skin patch 223 prior and during curing.

Further advantages of method 301 over convention repair methods include 1) significant time savings (approximately 25% of the time requirement compared to a conventional process); 2) the resulting repair is lighter weight compared to a conventional process, while providing the desired stiffness; 3) reduction of the required materials that would need to be stored in the field or maintenance facility; and 4) the process is simpler than a conventional process, which increases the repair success rate.

It should be appreciated that method 301 can be performed on a wide variety of core-stiffened structures. Further, the core-stiffened structures can have a core member 217 comprising any variety of materials, such as carbon, fiberglass, Kevlar®, plastic, metal, to name a few examples. Preferably core member 217 has cell members that are hexagonal; however, other implementation specific sizes may be used. The core member 217 has a plurality of hexagonal shaped cells that join together at cell wells.

The particular embodiments disclosed above are illustrative only, as the apparatuses and methods may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of repairing a core stiffened structure, the method comprising:
removing a damaged portion of the core stiffened structure to expose a non-damaged portion of an existing core member;
cutting a repair core member from a repair core material;
fitting the repair core member onto the existing core member such that the repair core member mates with the non-damaged portion of the existing core member;
bonding the repair core member to the existing core member; and
placing a skin patch over the repair core member,
wherein the step of bonding the repair core member to the existing core member includes pouring a foam mixture into a plurality of cells formed by the existing core member and the repair core member.

2. The method according to claim 1, wherein the step of removing the damaged portion includes removing a skin portion and a damaged core portion.

3. The method according to claim 1, wherein the step of removing the damaged portion forms a relatively planar surface on the non-damaged portion.

4. The method according to claim 1, further comprising:
allowing the foam mixture to expand and fill the plurality of cells so as to form an expanded foam; and
trimming the expanded foam.

5. The method according to claim 1, further comprising:
curing the skin patch.

6. The method according to claim 1, wherein the repair core member is configured as a locking mechanism to secure the repair core member to the non-damaged portion of the existing core member.

7. The method according to claim 1, wherein the step of fitting the repair core member onto the existing core member such that the cutout portion mates with the non-damaged portion of the existing core member causes a plurality of cells in the repair core member to align with a plurality of cells of the non-damaged portion of the existing core member.

8. The method according to claim 1, wherein the repair core member corresponds with a depth of which the repair core member can be fit onto the existing core member.

9. A method of repairing a core stiffened structure, the method comprising:
removing a damaged portion of the core stiffened structure to expose a non-damaged portion of an existing core member;

cutting a repair core member from a repair core material;
fitting the repair core member onto the existing core member such that the repair core member mates with the non-damaged portion of the existing core member;
bonding the repair core member to the existing core member; and
placing a skin patch over the repair core member,
wherein the step of cutting the repair core member includes clipping out a plurality of nodes only on the surface of the repair core member.

10. The method according to claim 9, wherein the plurality of nodes are locations where at least a first cell wall and a second cell wall join along a surface of the repair core member.

11. A method of repairing a core stiffened structure, the method comprising:
removing a damaged portion of the core stiffened structure to expose a non-damaged portion of an existing core member;
cutting a repair core member from a repair core material;
fitting the repair core member onto the existing core member such that the repair core member mates with the non-damaged portion of the existing core member;
bonding the repair core member to the existing core member; and
placing a skin patch over the repair core member,
wherein the step of cutting the repair core member includes clipping out a portion of a cell wall only on the surface of the repair core member.

12. The method according to claim 11, wherein the cutout is "V" shaped.

13. A method of repairing a core stiffened structure, the method comprising:
removing a damaged portion of the core stiffened structure to expose a non-damaged portion of an existing core member;
cutting a repair core member from a repair core material;
fitting the repair core member onto the existing core member such that the repair core member mates with the non-damaged portion of the existing core member;
bonding the repair core member to the existing core member; and
placing a skin patch over the repair core member,
wherein the step of fitting the repair core member onto the existing core member such that the repair core member mates with the non-damaged portion of the existing core member causes a plurality of nodes in the repair core member to align with an approximate center of a corresponding cell in the non-damaged portion of the existing core member.

* * * * *